Dec. 2, 1969   D. C. COX   3,482,246
ELIMINATION OF PHASE ERRORS DUE TO ANTENNA VIBRATION
Filed May 3, 1968
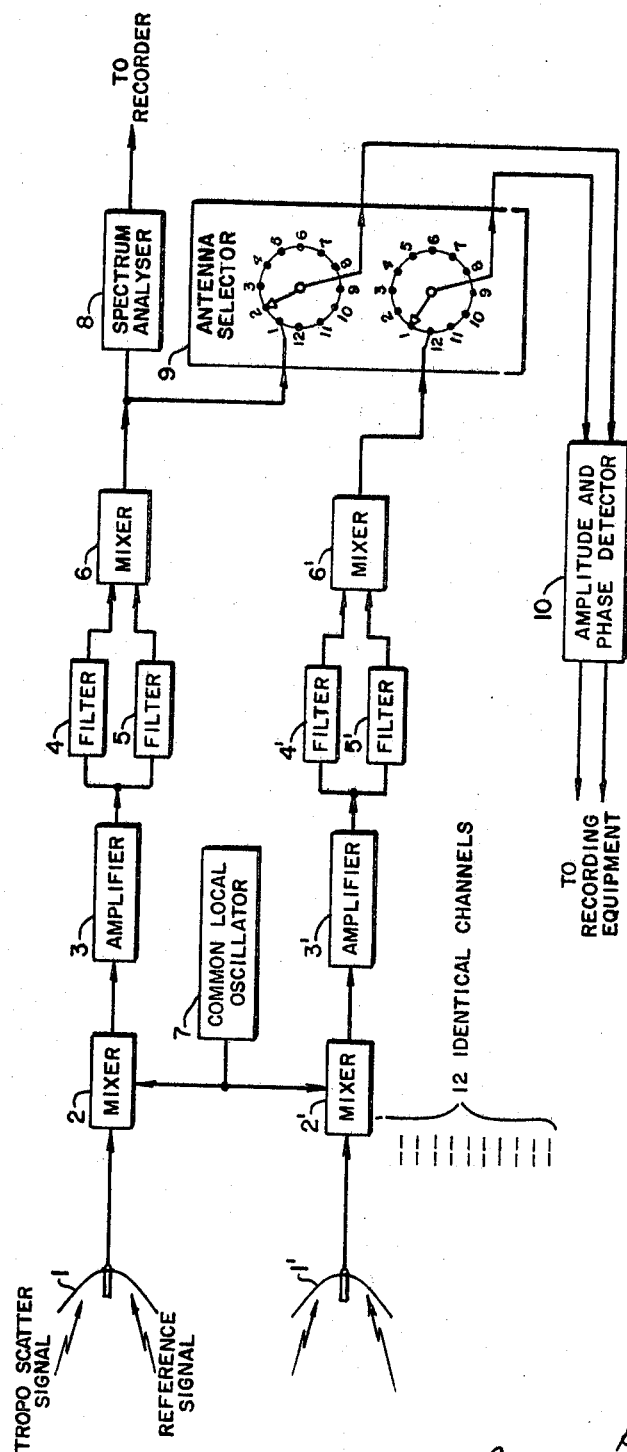
INVENTOR,
DONALD CLYDE COX.

United States Patent Office 3,482,246
Patented Dec. 2, 1969

3,482,246
ELIMINATION OF PHASE ERRORS DUE TO ANTENNA VIBRATION
Donald C. Cox, Palo Alto, Calif., assignor, by mesne assignments, to the United States of America as represented by the Secretary of the Army
Filed May 3, 1968, Ser. No. 726,303
Int. Cl. H04b 7/02
U.S. Cl. 343—100                                            8 Claims

ABSTRACT OF THE DISCLOSURE

A versatile vertical antenna array and receiving system for measuring relative phase and amplitude along the wavefront of an S-Band transhorizon signal is disclosed. The doppler spectrum at one or two of the antenna array elements can also be measured. The antenna array disclosed consists of 12 parabolic antennas, four feet in diameter, which are spaced 4.54 feet apart. In order to permit the use of a reasonable support structure, that is not absolutely rigid, a reference signal is transmitted to the array over a short line-of-sight path. The reference signal and the transhorizon signal both contain the phase effects of relative motion between array elements. The undesirable phase effects due to relative motion of the antenna array elements are removed by subtracting the reference signal from the transhorizon signal.

Background of the invention

This invention relates to transhorizon propagation, and more particularly to a multi-data-gathering antenna array and receiving system for transhorizon propagation wherein phase errors due to antenna vibration are eliminated.

The antenna array and receiving system are used to measure the relative phase and amplitude along the wavefront of a transhorizon signal. The output from each element of the antenna array is connected to a separate channel in the receiving system. To obtain proper phase measurements, the array elements of the antenna must remain fixed with reference to each other because any relative motion of the elements will introduce phase errors. The array elements can be held fixed by using an absolutely rigid support structure. However, an absolutely rigid structure is unreasonably large and is expensive to construct particularly if the antenna is appreciably large. In fact it is economically and physically impractical to construct a rigid support structure for large antenna arrays.

The present invention eliminates the need for an absolutely rigid antenna support structure by the use of a reference signal that is transmitted to the array over a short line-of-sight path. This reference signal contains in its phase the effects of any relative motion between array elements. In the receiving system the reference signal is subtracted from the transhorizon signal to remove the phase effects of relative antenna array element motion from the received transhorizon signal.

Summary of the invention

It is therefore an object of this invention to provide a system for eliminating phase errors due to antenna vibration.

Another object of this invention is to provide a multi-data-gathering antenna array for transhorizon propagation.

A further object of this invention is to provide an antenna array and receiving system for measuring relative phase and amplitude along the wave front of a transhorizon signal.

A still further object of this invention is to provide a multi-data-gathering antenna array wherein the antenna support structure is not absolutely rigid.

Brief description of the drawing

The above mentioned and other objects of the invention will be readily apparent from the following detailed description when read in conjunction with the annexed drawing in which the single figure shows a preferred embodiment of the invention.

Description of the preferred embodiment

A preferred embodiment as shown in the drawing comprises a first channel having a parabolic antenna 1, a first mixer 2, an amplifier 3, a first filter 4, a second filter 5 and a second mixer 6. A second channel identical to the first comprises a parabolic antenna 1', a first mixer 2', an amplifier 3', a first filter 4', a second filter 5' and a second mixer 6'. The entire system is composed of a total of 12 channels identical to the two channels just described. The first mixers of all the channels are supplied from a common local oscillator 7 through power dividers (not shown). The outputs of all the second mixers are connected to an antenna selector 9, where two successive outputs are sampled. The two outputs from the antenna selector 9 are applied to a phase and amplitude detector 10. The output from detector 10 is applied to a recorder (not shown). The output of one channel only is connected to a spectrum analyzer 8. The output from the spectrum analyzer 8 is applied to a recorder not shown. The circuits used for the components shown in block form in the drawing are conventional well known circuits. Therefore, the circuits will not be described in detail.

The operation of the invention can best be described with reference to a system that has been constructed and is presently in use. The system operates with a transhorizon signal at 3.2001 gc. and a reference signal at 3.200 gc. The antenna array consists of 12 parabolic antennas, 4 feet in diameter, that are spaced 4.54 feet apart on a tower. The total effective vertical aperture of the antenna is 50 feet (162λ).

The detailed operation will now be described with reference to one channel only because the operation of all 12 channels is identical. The transhorizon signal and the reference signal both appear at antenna 1 and are applied from antenna 1 to first mixer 2. The output from common local oscillator 7 is also applied to mixer 2. The frequency of the output signal from oscillator 7 is 3.230 gc. As was mentioned above local oscillator 7 is applied to the first mixers of all 12 channels. The transhorizon signal and the reference signal are both mixed with the local oscillator signal. The difference frequencies from mixer 2 (30 mc. for the reference signal and 29.9 mc. for the transhorizon signal) are then both amplified in amplifier 3 which is a wideband IF amplifier. After amplification the reference signal and the transhorizon signal are separated by means of crystal filters 4 and 5. Filters 4 and 5 have 2 kc. bandwidths. The transhorizon signal is then subtracted from the reference signal by second mixer 6 to produce a 100 kc. difference signal. The reference signal, which is stronger than the transhorizon signal, functions as the local oscillator for the mixing operation in mixer 6. The phase of the 100 kc. difference signal does not contain the effects of relative element motion or amplifier phase drifts because this signal is the difference between two signals which have been affected by the same element motion and amplifier phase drifts. The operation of all 12 channels is identical to the operation just described for one channel. Antenna selector 9 and detector 10 are used to process the information obtained from the second mixers of all 12 channels. The outputs of all the second mixers are connected to antenna selector 9. Antenna selector 9 rapidly samples the 100 kc. signals two at a time in the following sequence: (1–2), (2–3), (3–4), etc. The phase difference between the two samples, and the amplitude of one, are measured by amplitude and phase detector 10. The output of detector 10 is stored on magnetic tape. The information can be digitized before storage in a format suitable for computer processing. One sample of phase difference and amplitude can be taken in less than one millisecond. Of course the information can be processed by other means.

Since the outputs from each array is available on a continuous basis and since all basic system frequencies can be derived from crystal frequency standards, measurement of the doppler spectrum of the signal is possible. In the Figure spectrum analyzer 8 is shown as being connected to the output of only one of the second mixers. Spectrum analyzer 8 is used to measure the doppler spectrum of the transhorizon signal. The output of analyzer 8 is connected to a recorder for future processing.

I claim:

1. A system for eliminating phase errors due to antenna vibration comprising:
    an antenna array having a plurality of array elements for receiving a desired signal and a reference signal, said signals differing in frequency;
    separate but identical means connected to each of said array elements for eliminating phase errors introduced in the received signals by relative motion of said array elements, each of said means for eliminating phase errors comprising a first mixer connected to its associated antenna array element, an amplifier connected to the output of the first mixer, a first and second filter connected to the output of said amplifier for passing the desired and reference signals respectively, and a second mixer connected to the output of both said first and second filter; and,
    means connected to the second mixer of all of said phase error eliminating means for processing the output signals from said phase eliminating means.

2. A system for eliminating phase errors due to antenna vibrations as set forth in claim 1 wherein a common local oscillator is connected to all of said first mixers.

3. A system for eliminating phase errors due to antenna vibrations as set forth in claim 1 wherein the number of said array elements is 12.

4. A system for eliminating phase errors due to antenna vibrations as set forth in claim 2 wherein said means for processing the output signal from said phase eliminating means comprises an antenna selector connected to the output of all of said second mixers and a phase and amplitude detector connected to the output of said antenna selector.

5. A system for eliminating phase errors due to antenna vibrations as set forth in claim 4 wherein a doppler spectrum analyzer is connected to the output of one of said second mixers.

6. An antenna array and receiving system for measuring relative phase and amplitude along the wavefront of a transhorizon signal wherein phase errors due to antenna vibrations are eliminated comprising:
    an antenna array having a plurality of array elements for receiving a desired signal and a reference signal, said signals differing in frequency;
    a plurality of identical receiver channels so designed as to eliminate any phase errors introduced in the signal by antenna vibrations each of said means for eliminating phase errors comprising a first mixer connected to its associated antenna array element, an amplifier connected to the output of the first mixer, a first and second filter connected to the output of said amplifier for passing the desired and reference signals respectively, and a second mixer connected to the output of both said first and second filter;
    means to connect a different one of said receiver channels to each one of said array elements;
    means including an antenna selector and a phase and amplitude detector connected to the outputs of all said receiver channels; and
    a spectrum analyzer connected to the output of one of said receiver channels.

7. An antenna array and receiving system as defined in claim 6 wherein said antenna array contains 12 array elements.

8. An antenna array as defined in claim 7 wherein a common local oscillator is connected to the first mixer of all of said receiver channels.

References Cited

UNITED STATES PATENTS 2,510,280  6/1950  Goddard.
3,051,949  8/1962  Hunsicker.

RODNEY D. BENNETT, Jr., Primary Examiner

T. H. TUBBESING, Assistant Examiner

U.S. Cl. X.R.

343—113, 114, 116